Aug. 5, 1952 — L. H. LEAVIE — 2,605,970
HUMIDIFYING VALVE FOR STEAM RADIATORS
Filed Oct. 29, 1949
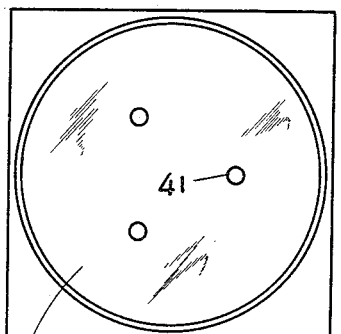
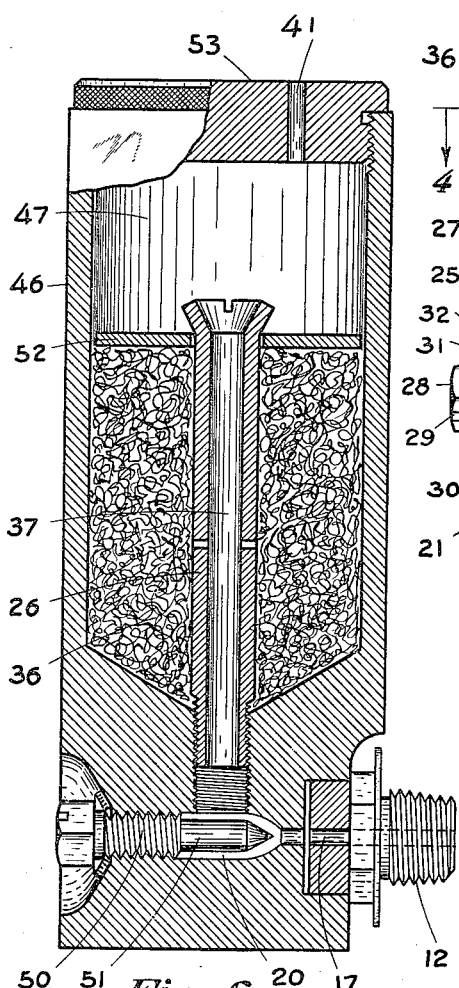
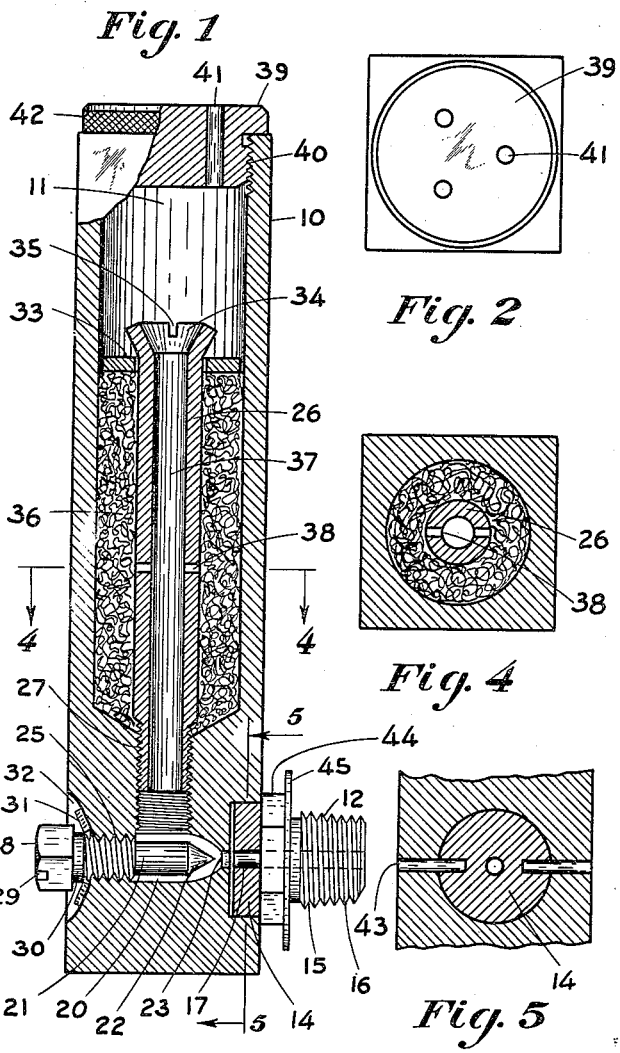
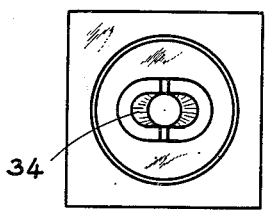
LOUIS H. LEAVIE
INVENTOR.
ATTORNEY Patented Aug. 5, 1952

2,605,970

UNITED STATES PATENT OFFICE 2,605,970

HUMIDIFYING VALVE FOR STEAM RADIATORS

Louis H. Leavie, Kew Garden Hills, N. Y.

Application October 29, 1949, Serial No. 124,459

5 Claims. (Cl. 237—78)

This invention relates to valves suitable for mounting on steam radiators, and more particularly valves designed to humidify the air in the room in addition to venting the radiators.

The unit is designed primarily for adaptation to radiators used for household or other type of heating installations, in which the steam pressure is held two pounds or less.

The valve, when suitably constructed, may also be utilized in installations, such as taller buildings, in which the steam distribution pressure is held at a higher level.

In the normal steam heating system, one of the problems encountered is the fact that the air in a room is rapidly dried by the heat of the radiator, so that some type of humidifying system must be employed in order to maintain the humidity at a comfortable level.

The simplest system generally used is the application of a pan partially filled with water, which is placed under the radiator, the heat evaporating the water, thereby humidifying the air in the room.

This necessitates adding a continuous supply of water to the pan, in order to render it effective.

The object of my invention is to provide a valve for steam radiators, which will simultaneously vent the radiator and humidify the air in the room in which the radiator is located.

A further object is to provide a valve, which will reduce the steam consumption, required to heat a room, under normal operating conditions.

A further object is to provide a valve, which can be readily adjusted, without special tools, to control the humidity in a room, and regulate the humidity in close approximation to the room temperature.

A primary object is to provide a radiator valve, which is simple, compact, can be easily installed without requiring special tools or skills, and can be operated over sustained periods without requiring frequent service and maintenance.

The accompanying drawings, illustrative of several embodiments and modifications of my invention, together with the description of their construction and the method of operation thereof, will serve to clarify further objects and advantages of my invention.

In the drawings:

Fig. 1 represents a vertical section through the valve assembly.

Fig. 2 is a plan view of the valve assembly, of Fig. 1, with the cap in place.

Fig. 3 is a plan view of the valve assembly, with the cap removed.

Fig. 4 is a cross-section through the valve body and tube, taken at 4—4, Fig. 1.

Fig. 5 represents a vertical section through the lower portion of the body, taken at 5—5, Fig. 1.

Fig. 6 represents a cross-section through a modification of the valve assembly of Fig. 1.

Fig. 7 is a plan view of the valve assembly of Fig. 6.

It will be understood that the following description of the construction and operation of the humidifying valve for steam radiators, is intended as explanatory of the invention and not restrictive thereof.

In the drawings, the same reference numerals designate the same parts throughout the various views, except where otherwise indicated.

One embodiment of the valve assembly, shown in Figs. 1, 2 and 3, may be mounted in a body 10, of square, hexagonal, or other suitable cross-section, having a long, substantially cylindrical chamber 11, formed through the center thereof.

A fitting 12 may be mounted in an opening formed in the lower portion of the body, the substantially cylindrical stem 14, of the fitting, being sweated, brazed, or otherwise attached to the wall of the opening in the body. The outer extension 15, of the fitting may have pipe threads 16, or other suitable form of threads, formed in the outer circumference thereof, the threads fitting corresponding threads in a fitting attached to the radiator (not shown), to support the valve in the conventional manner.

A small opening 17, of substantially circular cross-section may be formed through the center of the fitting, and the adjacent portion of the body, to feed the steam from the radiator, through the valve.

Concentric with the opening 17, a substantially cylindrical counterbore 20, may be formed in the body, one end of the counterbore walls being sloped inward, to form a frusto-conical passage for the steam, around the end of a substantially cylindrical valve stem 21, the forward end of which may be tapered, to form a substantially conical valve 22, which seats in the inner end 23, of the opening 17, when the valve is in the closed position. The diameter of the valve stem 21, is considerably smaller than that of the cylindrical counterbore 20, thus forming an annular passage around the valve stem.

Threads 25 may be formed in the enlarged body portion of the valve, adjacent the stem, the threads fitting into similar threads formed in an opening, in the wall of the body, substantially concentric with the counterbore 20.

A long substantially tubular vent 26, may be mounted in the center of the chamber 11, threads 27, formed at the bottom of the outer diameter of the tube, fitting into corresponding threads formed in an opening, through the lower wall of the body, in communication with the counterbore 20.

A head 28, of square, hexagonal or other suitable contour, may be formed integral with the stem of the valve, to provide means for manually adjusting the position of the valve stem, along the threaded section 25, to vary the area of the frusto-conical passage, at the forward end of the valve, a screw slot 29, being formed in the outer end of the head, to facilitate adjustment.

A shoulder 30, formed in the valve, below the head, may be seated against a dished washer 31, mounted in a similarly contoured counterbore 32, formed in the outer wall of the body, to provide a seal against the valve opening.

A washer 33, the outer diameter of which is less than the diameter of the chamber 11, may be mounted around the outer circumference of the tubular vent 26, below the top thereof, the upper end of the tube being expanded or ovaled 34, as indicated in Figs. 1 and 3, to retain the washer in position. A screw slot 35, may be formed in the upper end of the tube, to facilitate threading the tube into the body.

The chamber area below the washer 33, may be filled with soft cotton 36, or other suitable form of packing, to catch and retain any condensate passing through the central passage 37, of the vent tube, a small opening 38, being formed through the walls of the tube, as indicated in Figs. 1 and 4, to allow the steam to pass from the central passage 37, of the vent tube to the chamber, and the packing 36.

A cap 39 may be attached to the body, at the upper end of the chamber 11, threads 40, formed in the substantially cylindrical body portion of the cap, fitting into corresponding threads, formed in the upper end of the chamber, to retain the cap in the body. A plurality of small openings 41 of circular, or other suitable cross-section, may be formed through the cap, to provide a passage for the steam from the chamber 11, to the air in the room in which the radiator is located, as indicated in Figs. 1 and 2.

The outer circumference of the head 42, of the cap, may be knurled, or made in the form of a hexagon, or other suitable form, to facilitate gripping the cap.

To prevent rotation of the stem 14, within the opening in the body, a plurality of substantially cylindrical pins 43, may be inserted through openings formed in the wall of the body, and corresponding openings formed in the stem of the fitting, as indicated in Fig. 5.

A head 44, made in the form of a hexagon, or of other suitable contour, may be formed integral with the fitting, adjacent the extension 15, to facilitate threading the fitting into the radiator fitting, a washer 45, being provided below the head, to seal the opening in the radiator fitting.

The unit shown in Figs. 1, 2, and 3, is designed primarily for low-pressure steam installations, in which the pressure does not exceed two pounds per square inch.

In another modification of the valve unit, shown in Figs. 6, and 7, which is designed primarily for higher steam pressures, the body 46, is of considerably larger cross-sectional area, than that of Fig. 1, the chamber 47, formed through the center of the body providing a greater expansion area, around the vent tube.

The fitting 12, attached to the lower portion of body is substantially the same as that shown in Fig. 1, and hereinbefore described.

The valve 50, shown in Fig. 6, is substantially the same as that shown in Fig. 1, except that the stem 51, is considerably longer, than that of the valve of Fig. 1, to compensate for the increased width of the body.

The vent tube 26, is substantially the same as that shown in Fig. 1, and is supported in the body, in the same manner.

A washer 52, mounted below the top of the vent tube, is substantially the same, as that shown in Fig. 1, the chamber area, below the washer, being filled with cotton, or other suitable packing 36, in the same manner as that shown in Fig. 1.

A cap 53 may be attached to the upper end of the body, the threads formed in the cap seating in the threaded opening in the chamber, in the same manner, as that shown in Fig. 1.

A plurality of small openings 41, may be formed through the cap in substantially the same manner, as those shown in Figs. 1 and 2, and hereinbefore described.

The operation of the unit is substantially, as follows:

Steam from the radiator passes through the opening 17, in the fitting and the body, thence through the frusto-conical passage, around the valve, and the annular passage around the valve stem, through which it enters the central passage 37, of the vent tube.

As the area of the vent tube passage, and the annular passage, are considerably greater than that of the opening 17, the steam expands as it moves through the tube.

A portion of the steam passes through the openings formed in the vent tube walls, to the cotton packing in the chamber, surrounding the tube, any condensate formed in the steam being retained by the packing, the steam continuing upward through the annular space, formed around the washer 33, up through the upper portion of the chamber 11, and out through the vent openings 41, in the cap.

Another portion of the steam passes directly through the central opening 37, in the vent tube, up through the top of the tube into the chamber area above the washer 33, thence out through the vent openings in the cap.

Due to the large cross-sectional area of the chamber 11, as compared to the area of the vent tube passage, the steam expands, in the chamber, any condensate formed, passing through the annular space around the washer 33, to the packing below the washer.

The steam, after the free condensate is removed, passes through the openings 41, in the cap, thus simultaneously heating and humidifying the air in the room.

The flow of steam through the valve may be controlled by a thermostat, the thermostat shutting off the flow of steam, when the room temperature reaches a predetermined point.

The operation of the valve unit, shown in Figs. 6 and 7, is substantially the same as that of the valve, shown in Figs. 1 and 2, except that due to the considerably greater area of the chamber 47, of the valve of Fig. 6, steam of higher pressure can be accommodated.

The expansion of the steam in passing through the vent tube opening 37, of Fig. 6, into the chamber 47, is considerably greater than that of Fig. 1, so that the steam pressure is sharply reduced, before the steam passes through the openings 41 in the cap, and into the air in the room.

Due to the reduction in pressure in the chamber of the valve, the passage of the steam through the openings 41, in the cap, is relatively noiseless.

The valves, shown in Figs. 1 and 6, vent radiators faster than the conventional type of radiator vent valve, due to the larger passages provided for the steam.

The vapor passing through the openings in the cap, humidifies the air in the room, thus avoiding the necessity for auxiliary humidifying apparatus.

Due to the increase in humidity in the air in the room, the room is made comfortable, at a lower air temperature, than in the conventional heating system.

The heating system will operate at lower steam pressures, due to the rapid venting of the radiators, which reduces obstructions in the passages.

Because of the introduction of vapors and humidity into the air of the room, the room will heat more rapidly than in the conventional steam heating system.

In normal operation, the thermostat may be adjusted so that no steam emanates from the valve until the room temperature reaches approximately 68° F., the flow would be automatically shut off when the temperature reaches 70° F., or any other adjusted temperature, and would start again, when the temperature drops below the predetermined point.

Due to the fact that some steam is discharged directly into the room, it is essential that the water passages in the boiler, and the water supplied thereto be kept clean.

It is also essential that the water level in the boiler be kept high, to compensate for the steam discharged through the valve.

The body of the valve may be made of a single piece of brass bar, of square, hexagonal or other suitable cross-section, or it may be built up of several pieces, the lower portion being solid of square, or hexagonal cross-section, with the upper portion made of tubing, of substantially circular cross-section, the tubular portion being attached to the lower solid portion by welding, brazing or other suitable attaching means.

The size of the unit would be controlled by the pressure and volume of the steam which enters the valve.

For low pressure steam, a body, as indicated in Fig. 1, having a small expansion chamber may be used.

Where higher pressure steam is used, and greater expansion is required, a larger body, and consequently a larger chamber, such as that shown in Fig. 6, may be utilized.

The method of attaching the fitting to the body may be as indicated in Figs. 1 and 6, or the stem of the fitting may be threaded into the body, or attached by other suitable means.

For larger installations, the fitting and the body may be cast, or die cast in one piece.

It will be apparent to those skilled in the art that my present invention is not limited to the specific details described above and shown in the drawings, and that various further modifications are possible, in carrying out the features of the invention, without departing from the spirit and scope of the appended claims.

What I claim is:

1. A combination humidifier and vent valve for steam radiators, comprising a body having an expansion chamber formed therein, a fitting attached to said body, said fitting having an inlet opening formed therein, a substantially tubular vent attached to said body, a portion of said tube being located within the expansion chamber, a valve threadably mounted within the body, one end of said valve being adapted to seat in the inlet opening, the opposite end of the valve having a shoulder, formed integral therewith, said body having a cupped counterbore formed therein, surrounding the valve opening, a cupped washer abutting the shoulder, sealing the valve opening, the body having a plurality of openings formed therein connecting the interior of the vent tube to the inlet opening, compressible packing filling a portion of the area in the expansion chamber around the vent tube, the walls of the vent tube having a plurality of openings formed therethrough, said openings allowing steam to pass from the vent tube interior to the filling material, the filling material being adapted to retain condensate formed in the steam, a washer mounted in the expansion chamber, retaining the compressible packing, means formed integral with the tube, adjustably retaining the packing in the compressed condition, and means threadably attached to said body for closing the open end of the chamber, said closing means having a plurality of openings formed therethrough to allow steam from the chamber to pass into the atmosphere.

2. A combination humidifier and vent valve for steam radiators, comprising a body having an open-ended chamber formed therein, a fitting attached to said body, said fitting having an inlet opening formed therethrough, the body having an inlet opening formed therein in substantial alignment with the fitting opening, a substantially tubular vent attached to said body, said vent tube projecting into the expansion chamber, a valve adjustably mounted within said body, in substantial alignment with the inlet opening, the body having an opening formed therein around the stem of said valve, one end of said valve being adapted to seat in the inlet opening, a shoulder formed integral with said valve, a dished washer mounted adjacent the shoulder, the shoulder pressing the washer against the body to seal the valve opening, said opening forming an annular passage connecting the inlet opening with the interior of the vent tube, a porous material filling inserted in a portion of the expansion chamber around the vent tube, the wall of the vent tube having a plurality of openings formed therethrough, said openings allowing the steam to pass from the tube interior to the filling material, said filling material being adapted to retain any condensate formed in the steam, a washer mounted in the expansion chamber retaining the compressible packing, the upper end of the vent tube being expanded, the expanded tube end pressing against the washer, thereby retaining the packing in the compressed condition, and a cap removably attached to the body, said cap closing the open end of the chamber, said cap having a plurality of vent openings formed therethrough to allow the expanded steam from the chamber to pass into the atmosphere.

3. A combination humidifier and vent valve for steam radiators, comprising a body having a substantially cylindrical chamber formed therein, a fitting attached to said body, said fitting having an inlet opening formed therein, a substantially tubular vent attached to said body, a portion of said vent tube extending into the expansion chamber, the body having a plurality of openings formed therein connecting the interior of the vent tube to the inlet opening in the fitting, absorbent packing filling a portion of the area in the expansion chamber around the vent tube, a washer mounted in the chamber retaining the packing material, means formed in said tube locating the washer, the walls of the vent tube having a plurality of openings formed therethrough, said openings allowing steam to pass from the vent tube interior to the packing, the packing being adapted to retain condensate formed in the steam, and means attached to said body for closing the chamber, said closing means having a plurality of openings formed therethrough to allow steam from the chamber to pass into the atmosphere.

4. A combination humidifier and vent valve for steam radiators, comprising a body having a substantially cylindrical open-ended chamber formed therein, the body having an inlet opening formed therein, a fitting attached to the body, said fitting having an inlet opening formed therein, in substantial alignment with the inlet opening in the body, a substantially tubular vent attached to said body, said vent tube projecting into the expansion chamber, a valve having a cylindrical stem with a conical seating end threadably mounted within said body, in substantial alignment with the inlet opening, the conical seating end of said valve seating in the inlet opening, a head formed integral with said valve, means mounted adjacent the valve head for sealing the valve opening, the body having an opening formed therein around the stem of said valve, said opening forming an annular passage connecting the inlet opening with the interior of the vent tube, an absorbent material filling inserted in a portion of the expansion chamber around the vent tube, the wall of the vent tube having a plurality of openings formed therethrough, said openings allowing the steam to pass from the tube interior to the filling material, said filling material being adapted to retain any condensate formed in the steam, a washer mounted in the expansion chamber retaining the compressible packing, the upper end of the vent tube being flared outward, the flared upper tube end pressing against the washer, thereby retaining the packing in the compressed position, and a cap removably attached to the body, said cap closing the open end of the chamber, said cap having a plurality of vent openings formed therethrough to allow the expanded steam from the chamber to pass into the atmosphere.

5. A combination humidifier and vent valve for steam radiators, comprising a body having an expansion chamber formed therein, a fitting attached to said body, said fitting having an inlet opening formed therein, means formed in said fitting adapted to support the valve unit in the radiator, a substantially tubular vent attached to the body, a portion of said tube being located within the expansion chamber, a valve threadably mounted within the body, one end of said valve being adapted to seat in the inlet opening, a head formed integral with said valve, means mounted adjacent the head to seal the valve opening, the body having a plurality of openings formed therein connecting the interior of the vent tube to the inlet opening, the area of said vent tube interior being greater than that of the inlet opening to allow the steam to expand in passing through the vent tube, a porous material filling a portion of the area in the expansion chamber around the vent tube, a washer slidably mounted in the chamber to retain the porous material, means formed in the vent tube locating the washer, the walls of the vent tube having a plurality of openings formed therethrough, said openings allowing the steam to pass from the tube interior to the filling material, said filling material being adapted to retain the condensate formed in the steam, and a cap removably attached to the body, said cap closing the open end of the chamber, said cap having a plurality of vent openings formed therethrough to allow the expanded steam to pass out of the chamber.

LOUIS H. LEAVIE.

REFERENCES CITED

The following references are of record in the file of this patent:

UNITED STATES PATENTS

| Number | Name | Date |
| --- | --- | --- |
| 414,179 | Bailey | Nov. 5, 1889 |
| 1,182,625 | Bement | May 9, 1916 |
| 1,624,774 | Bauer | Apr. 12, 1927 |
| 1,838,405 | Jones | Dec. 29, 1931 |
| 1,954,942 | Mueller | Apr. 17, 1934 |